United States Patent
Imagawa et al.

(10) Patent No.: US 7,074,268 B2
(45) Date of Patent: Jul. 11, 2006

(54) PIGMENT COMPOSITION AND PRINTING INK CONTAINING THE SAME

(75) Inventors: Ippei Imagawa, Tokyo (JP); Ataru Chiba, Tokyo (JP); Takahiro Yuasa, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/994,298

(22) Filed: Nov. 23, 2004

(65) Prior Publication Data
US 2005/0119369 A1 Jun. 2, 2005

(30) Foreign Application Priority Data
Nov. 28, 2003 (JP) ............................. 2003-398622

(51) Int. Cl.
*C09B 67/20* (2006.01)
*C09D 11/02* (2006.01)

(52) U.S. Cl. .................. 106/493; 106/31.72; 106/410; 106/412; 106/413; 106/496; 106/497; 106/498; 106/499; 523/160

(58) Field of Classification Search ................. 106/410, 106/412, 413, 493, 496, 497, 498, 499, 31.72; 523/160
See application file for complete search history.

(56) References Cited

U.S. PATENT DOCUMENTS

| | | | |
|---|---|---|---|
| 4,057,436 A | 11/1977 | Davies et al. | |
| 4,554,019 A | 11/1985 | Moynihan | |
| 5,286,855 A | * | 2/1994 | Nonaka et al. ............. 540/138 |
| 6,860,934 B1 | * | 3/2005 | Shiromaru et al. ......... 106/412 |

FOREIGN PATENT DOCUMENTS

| | | |
|---|---|---|
| EP | 0 392 334 A2 | 10/1990 |
| EP | 0 632 335 A1 | 1/1995 |
| EP | 0 819 740 A1 | 1/1998 |
| EP | 0 921 163 A2 | 6/1999 |
| GB | 540905 | 11/1941 |
| GB | 1 224 627 | 3/1971 |
| JP | 63-374 A * | 1/1988 |
| JP | 2003-231829 A * | 8/2003 |
| JP | 2003-335997 A * | 8/2003 |

OTHER PUBLICATIONS

Database WPI, Section Ch, Week 199714 Derwent Publications Ltd., London, GB; AN 1997-149916 XP002317749-Abstract of JP 09-025444 A, Jan. 28, 1997.
Patent Abstracts of Japan, vol. 2000, No. 01, Jan. 31, 2000-Abstract of JP 11-293169A, Oct. 26, 1999.
Patent Abstracts of Japan, vol. 1999, No. 01, Jan. 29, 1999-Abstract of JP 10-279872 A, Oct. 20, 1998.

* cited by examiner

*Primary Examiner*—Anthony J. Green
(74) *Attorney, Agent, or Firm*—Wenderoth, Lind & Ponack, L.L.P.

(57) ABSTRACT

A pigment composition obtainable by dry-milling an organic pigment in the presence of a resin for a printing ink, the resin being composed of a synthetic resin for a printing ink in an amount of 10 to 80 parts by weight per 100 parts by weight of the organic pigment and an aliphatic hydrocarbon resin which is extracted from gilsonite and has a softening point of 120 to 125° C. in an amount of 0.1 to 5 parts by weight per 100 parts by weight of the organic pigment.

5 Claims, No Drawings

PIGMENT COMPOSITION AND PRINTING INK CONTAINING THE SAME

TECHNICAL FIELD OF THE INVENTION

The present invention relates to a fluidity-improved pigment composition for a printing ink containing an organic pigment as a colorant. Further, it relates to a pigment composition obtainable by dry-milling an organic pigment in the presence of a resin for a printing ink, which is characterized in that the resin for a printing ink is composed of a synthetic resin for a printing ink in an amount of 10 to 80 parts by weight per 100 parts by weight of the organic pigment and an aliphatic hydrocarbon resin which is extracted from gilsonite and has a softening point of 120 to 125° C. in an amount of 0.1 to 5 parts by weight per 100 parts by weight of the organic pigment.

PRIOR ARTS OF THE INVENTION

It is known that gilsonite, which is a natural product, is added to a varnish component for improving the printability of a printing ink such as dispersibility or fluidity (JP-A-07-176012 and JP-A-10-279872). Gilsonite itself is black so that it is solely used for a carbon black containing ink. Gilsonite impairs the clearness of chromatic inks. Therefore, if gilsonite is used for a chromatic ink, the amount thereof is limited to an extremely small amount. Under the above limitation, the effect of improving fluidity, etc., is small, so that gilsonite has not been practically used for chromatic inks.

SUMMARY OF THE INVENTION

It is an object of the present invention to provide a pigment composition excellent in fluidity without substantially making a hue, such as clearness, dirty by increasing the effect of improving the fluidity of gilsonite whose uses have been limited to a carbon black containing ink.

According to the present invention, there is provided a pigment composition obtainable by dry-milling an organic pigment in the presence of a resin for a printing ink, the resin being composed of a synthetic resin for a printing ink in an amount of 10 to 80 parts by weight per 100 parts by weight of the organic pigment and an aliphatic hydrocarbon resin which is extracted from gilsonite and has a softening point of 120 to 125° C. in an amount of 0.1 to 5 parts by weight per 100 parts by weight of the organic pigment.

According to the present invention, there is further provided a process for the production of a pigment composition, comprising dry-milling 100 parts by weight of an organic pigment in the presence of 10 to 80 parts by weight of a synthetic resin for a printing ink and 0.1 to 5 parts by weight of an aliphatic hydrocarbon resin which is extracted from gilsonite and has a softening point of 120 to 125° C.

According to the present invention, there is furthermore provided a printing ink containing the resin composition recited above as a colorant.

DETAILED DESCRIPTION OF THE INVENTION

The pigment composition of the present invention is obtained by dry-milling at least three components, which are an organic pigment, a synthetic resin for a printing ink and an aliphatic hydrocarbon which is extracted from gilsonite and has a softening point of 120 to 125° C., substantially at the same time.

The dry-milling results in adjusting the particle diameter of the pigment finely and surface-treating the pigment with the above resins homogeneously. It is estimated that the above dry milling brings about the feature of the present invention that even a small amount of the resin extracted from gilsonite can achieve the effect.

In the dry-milling, there may be adopted a method in which the above three components are one by one added so long as it includes the step of dry-milling all of the three components at the same time.

A dry-milling machine can be selected from a dry type attritor, a ball mill, a vibrating mill, and the like. Each of these dry-milling machines has its own rational media amount, material amount and milling time. Color development increases with an increase in the milling time of the pigment, while, when a milled pigment composition is used for preparing an ink, it is required to decide the milling time in consideration of the condition of the ink. Excessive milling causes deterioration in dispersibility and a decrease in the fluidity of the ink.

The milling temperature is typically from room temperature to 170° C., preferably from 40° C. to 100° C. As for factors to decide a preferable temperature, one factor is the softening point of a resin to be used, and another factor is, for example, the crystal conversion property of a copper phthalocyanine pigment of which crystals converts during the milling. Under a temperature close to the softening point of a resin, fusing of the resin occurs inside a milling machine due to softening of the resin, which may cause a problem in production. However, even when the resin softens, no problem in production arises depending on the amount of the resin used in some cases. Further, when the organic pigment is a copper phthalocyanine, α type crystals generate by milling, while conversion into stable β type crystals advances due to heat at the same time. Milling under a high temperature is preferable for obtaining a pigment composition abundant with β type crystals which are generally useful for printing inks.

The organic pigment used in the present invention can be selected from organic pigments generally used for printing inks, such as azo pigments, phthalocyanine pigments and fused polycyclic pigments. In particular, the effect of the present invention on phthalocyanine pigments or azo yellow pigments delicate concerning a hue is high.

The synthetic resin for a printing ink used in the present invention includes a rosin-modified phenol resin, a rosin-modified maleic acid resin, an alkyd resin, a petroleum resin, etc. The rosin-modified phenol resin is preferably used. These synthetic resins may be used alone or in combination. These resins increase the dispersibility of the pigment into a varnish when the pigment composition is used to prepare an ink. The synthetic resin is selected in consideration of the relation to physical properties of a printing ink to be obtained, i.e., the compatibility with a varnish to be used or the viscosity when dissolved.

The amount of the synthetic resin for a printing ink is 10 to 80 parts by weight, preferably 20 to 60 parts by weight, per 100 parts by weight of the organic pigment. When the amount of the synthetic resin is too small, the dispersibility of the pigment in a varnish decreases. When it is too large, the productivity per the amount of the organic pigment decreases or the general versatility of the pigment composition to a varnish decreases in some cases.

The aliphatic hydrocarbon resin, which is extracted from gilsonite and has a softening point of 120 to 125° C., is a resin formed of an aliphatic hydrocarbon extracted from gilsonite, i.e., natural asphaltum, and it contains substantially no aromatic hydrocarbon, no ash content and no light fraction. The above aliphatic hydrocarbon resin is free from gilsonite's conventional problems such as instability in viscosity, harmful influences due to aggregation, or an offensive odor. Further, the above aliphatic hydrocarbon resin is excellent in solubility in nonaromatic petroleum solvents and plant oils.

As a hydrocarbon resin, generally, there are known aliphatic hydrocarbon resins synthesized from petroleum type raw materials such as polyethylene and polypropylene, aromatic hydrocarbon resins synthesized from tar type raw materials such as a styrene resin and a coumarone-indene resin, alicyclic compounds such as a terpene resin, andpetroleum resins obtained by copolymerization of an olefin fraction having 5 or more carbon atoms. However, these synthetic resins cannot give the effect of improvement in fluidity, which can be obtained by the present invention.

The amount of the aliphatic hydrocarbon resin extracted from gilsonite and having a softening point of 120 to 125° C. is 0.1 to 5 parts by weight, preferably 0.2 to 3 parts by weight, per 100 parts by weight of the organic pigment. When the amount of the aliphatic hydrocarbon resin is increased, the effect of an improvement in fluidity increases, while hue is apt to become dirty. This is the same tendency as that shown in a conventional method in which gilsonite is added to a varnish. However, the composition of the present invention is characterized in that even an extremely small amount of the aliphatic hydrocarbon resin extracted from gilsonite can give the effect of improvement in fluidity. No threshold meaning is found with regard to the amount to be added, so that the amount should be decided in consideration of a balance between desired fluidity and hue.

A very small amount of an additive, such as an antioxidant or a variety of conditioners and solvents to be added to printing inks, may be added to the pigment composition of the present invention during or after the dry-milling.

Effect of the Invention

The pigment composition of the present invention is able to provide a printing ink excellent in fluidity without substantially making a hue of a chromatic ink dirty in spite of the use of a gilsonite type resin.

The pigment composition of the present invention is usable for a colorant-containing composition required to have fluidity, dispersibility, tinting strength and clear hue at the initial period and with the passage of time.

EXAMPLES

The present invention will be explained more in detail with reference to Examples and Comparative Examples hereinafter. Evaluation of fluidity was carried out as follows. A measuring apparatus had an integrated structure of a domed inkpot (about 2 ml) and a flow board. The leaning angle of the flow board could be arbitrarily adjusted from the horizontal to the vertical. In a measurement, first, the flowboard was adjusted horizontally, the inkpot was exactly filled with a well-kneaded ink for evaluation, it was allowed to stand at 25° C. for 1 hour, and then the flow board was leaned vertically. Inks excellent in fluidity dripped from the inkpot with time. Inks extremely poor in fluidity remained in the inkpot and did not drip. The length of ink dripped was measured 10 minutes later after leaning the flowboard vertically. As the dripped ink length becomes longer, the fluidity is considered to be better.

An attritor having a tank volume of 0.75 L was used for the dry-milling. 2 kg of ⅜ inch steal beads were filled into the attritor. The rotational speed for milling was 360 rpm. The dry-milling was carried out by circulating a 70° C.-heating medium.

ER-125RESIN supplied by American Gilsonite (to be referred to as "ER125" hereinafter) was used as an aliphatic hydrocarbon resin extracted from gilsonite and having a softening point of 120° C. to 125° C. Further, "part" stands for "part by weight" hereinafter.

Example 1

An attritor was charged with 70 g of a crude copper phthalocyanine, 34.3 g of a rosin-modified phenol resin (Tamanol 366, supplied by Arakawa Chemical Industries, Ltd.) and 0.7 g of ER125, and the mixture was dry-ground for 45 minutes, to obtain a pigment composition. 23.85 parts of the pigment composition and 41.15 parts of a base varnish for an offset printing press ink were stirred at 130° C. for 1 hour. Then, the stirred mixture was kneaded with a three-roll mill, and it was confirmed with a grind meter that dispersed particles were 7.5 μm or less in size, whereby a base ink was prepared. Then, 27 parts of a conditioning varnish for an offset printing press ink was added to 65 parts of the base ink. Further, a conditioning varnish and a nonaromatic petroleum solvent were added such that the tackiness became 9.0. The total of all the components was 100 parts. The fluidity test value of this ink was 10.3 cm. The tackiness was measured with a digital inkometer, supplied by Toyo Seiki Seisaku-sho, Ltd., at an ink volume of 1.3 ml at a roll rotational speed of 400 rpm and at 30° C.

Comparative Example 1

An attritor was charged with 70 g of a crude copper phthalocyanine and 35 g of a rosin-modified phenol resin (Tamanol 366, supplied by Arakawa Chemical Industries, Ltd.), and the mixture was dry-ground for 45 minutes, to obtain a pigment composition. 23.85 parts of the pigment composition and 41.15 parts of a base varnish for an offset printing press ink were stirred at 130° C. for 1 hour. Then, the stirred mixture was kneaded with a three-roll mill, and it was confirmed with a grind meter that dispersed particles were 7.5 μm or less in size, whereby abase ink was prepared. Then, 27 parts of a conditioning varnish for an offset printing press ink was added to 65 parts of the base ink. Further, a conditioning varnish and a nonaromatic petroleum solvent were added such that the tackiness became 9.0. The total of all the components was 100 parts. The fluidity test value of this ink was 3.3 cm.

Comparative Example 2

ER125 was dissolved in a nonaromatic petroleum solvent to obtain a varnish having an ER 125 content of 50%, in advance. 23.85 parts of the pigment composition obtained in Comparative Example 1, 40.832 parts of abase varnish for an offset printing press ink and 0.318 part of the above varnish were stirred at 130° C. for 1 hour. Then, the stirred mixture was kneaded with a three-roll mill, and it was confirmed with a grind meter that dispersed particles were 7.5 μm or less in size, whereby a base ink was prepared. Then, 27 parts of a conditioning varnish for an offset printing press ink was added to 65 parts of the base ink. Further, a conditioning varnish and a nonaromatic petroleum solvent were added such that the tackiness became 9.0. The total of all the components was 100 parts. The fluidity test value of this ink was 5.4 cm. The content of ER125 in the ink as an end product was the same as that in Example 1.

Example 2

An attritor was charged with 70 g of a crude copper phthalocyanine, 42.0 g of a rosin-modified phenol resin (Tamanol 366, supplied by Arakawa Chemical Industries, Ltd.) and 3.5 g of ER125, and the mixture was dry-ground for 45 minutes, to obtain a pigment composition. 20.625 parts of the pigment composition and 37.875 parts of a base varnish for a news ink were stirred at 130° C. for 1 hour. Then, the stirred mixture was kneaded with a three-roll mill, and it was confirmed with a grind meter that dispersed particles were 7.5 µm or less in size, whereby a base ink was prepared. Then, 33.5 parts of a conditioning varnish for a news ink was added to 58.5 parts of the base ink. Further, a conditioning varnish and a nonaromatic petroleum solvent were added such that the tackiness became 3.9. The total of all the components was 100 parts. The fluidity test value of this ink was 8.7 cm.

Comparative Example 3

An attritor was charged with 70 g of a crude copper phthalocyanine and 45.5 g of a rosin-modified phenol resin (Tamanol 366, supplied by Arakawa Chemical Industries, Ltd.), and the mixture was dry-ground for 45 minutes, to obtain a pigment composition. 20.625 parts of the pigment composition and 37.875 parts of a base varnish for a news ink were stirred at 130° C. for 1 hour. Then, the stirred mixture was kneaded with a three-roll mill, and it was confirmed with a grind meter that dispersed particles were 7.5 µm or less in size, whereby a base ink was prepared. Then, 33.5 parts of a conditioning varnish for a news ink was added to 58.5 parts of the base ink. Further, a conditioning varnish and a nonaromatic petroleum solvent were added such that the tackiness became 3.9. The total of all the components was 100 parts. The fluidity test value of this ink was 0.0 cm.

Example 3

An attritor was charged with 70 g of a crude copper phthalocyanine, 14.0 g of a rosin-modified phenol resin (Tamanol 366, supplied by Arakawa Chemical Industries, Ltd.) and 0.14 g of ER125, and the mixture was dry-ground for 45 minutes, to obtain a pigment composition. 18.631 parts of the pigment composition and 47.669 parts of a base varnish for a sheet-feed press ink were stirred at 130° C. for 1 hour. Then, the stirred mixture was kneaded with a three-roll mill, and it was confirmed with a grind meter that dispersed particles were 7.5 m or less in size, whereby a base ink was prepared. Then, 25.7 parts of a conditioning varnish for a sheet-feed press ink was added to 66.3 parts of the base ink. Further, a conditioning varnish and a nonaromatic petroleum solvent were added such that the tackiness became 6.0. The total of all the components was 100 parts. The fluidity test value of this ink was 6.6 cm.

Comparative Example 4

An attritor was charged with 70 g of a crude copper phthalocyanine and 14.14 g of a rosin-modified phenol resin (Tamanol 366, supplied by Arakawa Chemical Industries, Ltd.), and the mixture was dry-ground for 45minutes, to obtain a pigment composition. 18.631 parts of the pigment composition and 47.669 parts of a base varnish for a sheet-feed press ink were stirred at 130° C. for 1 hour. Then, the stirred mixture was kneaded with a three-roll mill, and it was confirmed with a grind meter that dispersed particles were 7.5 µm or less in size, whereby a base ink was prepared. Then, 25.7 parts of a conditioning varnish for a sheet-feed press ink was added to 66.3 parts of the base ink. Further, a conditioning varnish and a nonaromatic petroleum solvent were added such that the tackiness became 6.0. The total of all the components was 100 parts. The fluidity test value of this ink was 4.2 cm.

Example 4

An attritor was charged with 38.889 g of a pigment of Pigment Yellow 12 having a specific surface area of 33 $m^2/g$, 23.333 g of a rosin-modified phenol resin (Tamanol366, supplied by Arakawa Chemical Industries, Ltd.), 7.7 g of a petroleum resin (NEO Polymer 130, supplied by NIPPON GOSEIJUSI) and 0.078 g of ER125, and the mixture was dry-milled for 70 minutes, to obtain a pigment composition. 17.28 parts of the pigment composition and 53.72 parts of a base varnish for an offset printing press ink were stirred at 80° C. for 1 hour. Then, the stirred mixture was kneaded with a three-roll mill, and it was confirmed with a grind meter that dispersed particles were 7.5 µm or less in size, whereby a base ink was prepared. Then, 21 parts of a conditioning varnish for an offset printing press ink was added to 71 parts of the base ink. Further, a conditioning varnish and a nonaromatic petroleum solvent were added such that the tackiness became 4.5. The total of all the components was 100 parts. The fluidity test value of this ink was 6.5 cm.

Comparative Example 5

An attritor was charged with 38.889 g of a pigment of Pigment Yellow 12 having a specific surface area of 33 $m^2/g$, 23.333 g of a rosin-modified phenol resin (Tamanol 366, supplied by Arakawa Chemical Industries, Ltd.) and 7.778 g of a petroleum resin (NEO Polymer 130, supplied by NIPPON GOSEIJUSI), and the mixture was dry-milled for 70 minutes, to obtain a pigment composition. 17.28 parts of the pigment composition and 53.72 parts of a base varnish for an offset printing press ink were stirred at 80° C. for 1 hour. Then, the stirred mixture was kneaded with a three-roll mill, and it was confirmed with a grind meter that dispersed particles were 7.5 µm or less in size, whereby a base ink was prepared. Then, 21 parts of a conditioning varnish for an offset printing press ink was added to 71 parts of the base ink. Further, a conditioning varnish and a nonaromatic petroleum solvent were added such that the tackiness became 4.5. The total of all the components was 100 parts. The fluidity test value of this ink was 2.4 cm.

Comparative Example 6

ER125 was dissolved in a nonaromatic petroleum solvent to obtain a varnish having an ER 125 content of 50%, in advance. 17.28 parts of the pigment composition obtained in Comparative Example 3, 53.682 parts of abase varnish for an offset printing press ink and 0.038 part of the above varnish were stirred at 80° C. for 1 hour. Then, the stirred mixture was kneaded with a three-roll mill, and it was confirmed with a grind meter that dispersed particles were 7.5 µm or less in size, whereby a base ink was prepared.

Then, 21 parts of a conditioning varnish for an offset printing press ink was added to 71 parts of the base ink. Further, a conditioning varnish and a nonaromatic petroleum solvent were added such that the tackiness became 4.5. The total of all the components was 100 parts. The fluidity test value of this ink was 3.0 cm. The content of ER125 in the ink as an end product was the same as that in Example 4.

Table 1 shows results of the fluidity tests and calorimetric values of printed matters in Examples 1 to 4 and Comparative Examples 1 to 6. Printings were carried out with an IGT printability tester, model number C1-5, at a weight of 250N.

TABLE 1

|  | Fluidity (cm) | Data of Printed matters | | |
| --- | --- | --- | --- | --- |
|  |  | Clearness C* | Hue H (ab) | Macbeth density |
| Example 1 | 10.3 | 48.0 | 254.5 | 2.04 |
| Comparative Example 1 | 3.3 | 48.3 | 254.8 | 2.05 |
| Comparative Example 2 | 4.8 | 48.0 | 254.3 | 2.04 |
| Example 2 | 8.7 | 32.0 | 254.1 | 1.16 |
| Comparative Example 3 | 0.0 | 33.2 | 253.4 | 1.18 |
| Example 3 | 6.6 | 48.0 | 257.5 | 2.20 |
| Comparative Example 4 | 4.2 | 48.2 | 257.7 | 2.20 |
| Example 4 | 6.5 | 87.8 | 101.4 | 1.31 |
| Comparative Example 5 | 2.4 | 88.4 | 101.5 | 1.30 |
| Comparative Example 6 | 3.0 | 87.7 | 101.3 | 1.31 |

What is claimed is:

1. A pigment composition obtained by dry-milling an organic pigment admixed with a resin for a printing ink, the resin being composed of a synthetic resin for a printing ink in an amount of 20 to 60 parts by weight per 100 parts by weight of the organic pigment and an aliphatic hydrocarbon resin which is extracted from gilsonite and has a softening point of 120 to 125° C in an amount of 0.1 to 5 parts by weight per 100 parts by weight of the organic pigment.

2. The pigment composition according to claim 1, wherein the organic pigment is a phthalocyanine pigment or an azo yellow pigment.

3. The pigment composition according to claim 1, wherein the synthetic resin for a printing ink is a rosin-modified phenol resin.

4. A printing ink containing the pigment composition recited in claim 1 as a colorant.

5. A process for the production of a pigment composition, comprising dry-milling 100 parts by weight of an organic pigment admixed with 10 to 80 parts by weight of a synthetic resin for a printing ink and 0.1 to 5 parts by weight of an aliphatic hydrocarbon resin which is extracted from gilsonite and has a softening point of 120 to 125° C.

* * * * *